United States Patent [19]

Stark et al.

[11] Patent Number: 5,021,248

[45] Date of Patent: Jun. 4, 1991

[54] HYDROPHOBIC PROTEIN MICROPARTICLES AND PREPARATION THEREOF

[75] Inventors: Leonard E. Stark, Naperville, Ill.; Akiva T. Gross, Newton, Mass.

[73] Assignee: Enzytech, Inc., Cambridge, Mass.

[21] Appl. No.: 403,111

[22] Filed: Sep. 1, 1989

Related U.S. Application Data

[63] Continuation-in-part of Ser. No. 246,435, Sep. 19, 1988, abandoned.

[51] Int. Cl.$^5$ .............................. A23J 1/12; C08H 1/00
[52] U.S. Cl. ..................................... 426/96; 106/149; 426/531; 426/656; 426/804; 530/373
[58] Field of Search ................... 426/96, 98, 531, 656, 426/804; 106/149; 530/373

[56] References Cited

U.S. PATENT DOCUMENTS

| | | |
|---|---|---|
| 2,044,769 | 6/1936 | Buron et al. . |
| 2,156,928 | 5/1939 | Swallen . |
| 2,238,591 | 4/1941 | Horesi et al. . |
| 2,360,081 | 10/1944 | Stewart . |
| 2,377,237 | 5/1945 | James . |
| 2,676,169 | 4/1954 | Baldoni . |
| 3,116,206 | 12/1963 | Brynko et al. . |
| 3,663,687 | 5/1972 | Evans . |
| 3,723,407 | 3/1973 | Miller et al. . |
| 3,793,464 | 2/1974 | Rusch . |
| 3,852,503 | 12/1974 | Magnino et al. . |
| 3,853,839 | 12/1974 | Magnino et al. . |
| 3,891,778 | 6/1975 | Boyer . |
| 4,051,269 | 9/1977 | Strinning . |
| 4,137,300 | 1/1979 | Sheth et al. . |
| 4,364,868 | 12/1982 | Hargreaves . |
| 4,376,133 | 3/1983 | Farnand . |
| 4,420,442 | 12/1983 | Sands . |
| 4,510,166 | 4/1985 | Lenchin et al. . |
| 4,515,825 | 5/1985 | Moran et al. . |
| 4,671,954 | 6/1987 | Goldberg . |
| 4,734,287 | 4/1988 | Singer et al. . |
| 4,855,156 | 8/1989 | Singer et al. ............. 426/565 |
| 4,876,094 | 10/1989 | Benton et al. ............. 424/491 |
| 4,891,777 | 6/1975 | Boyer . |

FOREIGN PATENT DOCUMENTS

| | | |
|---|---|---|
| 89307492.2 | 1/1990 | European Pat. Off. . |
| 88/04120 | 11/1988 | PCT Int'l Appl. . |
| 89/02416 | 12/1989 | PCT Int'l Appl. . |
| 651396 | of 0000 | United Kingdom . |

OTHER PUBLICATIONS

C. D. Evans and R. H. Manley, Industrial and Engineering Chemistry, pp. 1416-1417 (Nov., 1941).
B. Eckman et al., Biochemistry, 15(23):8115 (1976).
P. Edman et al., Journal of Pharmaceutical Sciences, 69(7): 838-842 (1980).
P. Artursson et al., Journal of Pharmaceutical Sciences, 73(11): 1507-1513 (1984).
B. Eckman and I. Sjoholm, Journal of Pharmaceutical Sciences, 67(5):693-696 (1978).
P. Artursson et al., The Journal of Pharmacology and Experimental Therapeutics, 234(1):255-260 (1985).
International Search Report for International Application No. PCT/US89/03991.
Fennena, Food Chemistry 1985, pp. 349-363.

*Primary Examiner*—Donald E. Czaja
*Assistant Examiner*—Evan Federman
*Attorney, Agent, or Firm*—Hamilton, Brook, Smith & Reynolds

[57] ABSTRACT

Water-dispersible microparticles of hydrophobic, water-insoluble, non-denatured protein, and method for preparing a suspension of these microparticles by the controlled precipitation of the protein, is described. The suspension can be used as a substitute for most dietary fats, or to encapsulate selected molecules. The water-insoluble proteins used in the process can be chemically or enzymatically modified to enhance the properties of the microparticles.

41 Claims, 2 Drawing Sheets

HYDROPHOBIC PROTEIN MICROPARTICLES AND PREPARATION THEREOF

RELATED APPLICATIONS

This application is a continuation-in-part of U.S. application Ser. No. 07/246,435 by Stark et al. filed Sept. 19, 1988, now abandoned.

BACKGROUND OF THE INVENTION

Protein concentrates have long been recognized as an important component of processed foods. The need for protein is becoming more important as a basic nutritional requirement. New sources of protein concentrates are being sought to supplement the usual protein materials such as dry milk solids and soybean extracts. These protein concentrates are used in diet supplements and commercially prepared foods.

Protein concentrates have been much in demand particularly as fat substitutes. Natural fats have 9 Kcal (kilocalories) per gram, and proteins have 4 Kcal per gram, thus, replacing fats in foods with proteins results in a significant calorie savings. In addition, a diet high in fats has been linked with health disorders such as obesity, heart disease and atherosclerosis. Therefore, replacing the fats in foods with proteins has the desirable effect of improving the nutritional quality of the food, as well as reducing its caloric content. Protein concentrates can be used for this purpose; however, in order to be acceptable, the protein concentrates must be devoid of odors, flavors and colors which would render them unacceptable as a food substance.

Many proteins which are currently used in food processing are derived from vegetable sources, such as cereals and grains, or animal sources, such as milk solids. Many of these are described in the patent literature. In U.S. Pat. No 4,376,133, J. R. Farand describes a process in which proteins derived from cereal grains, oilseeds or legume seeds are suspended in an organic solvent, then agglomerated by contacting the suspension with a polar solvent. This process forms solid agglomerates (up to 1000 microns in size) suitable for use in breakfast cereals and other foods, but which are not suitable as fat substitutes due to their agglomerated form and large size, or for microencapsulation purposes.

In U.S. Pat. Nos. 3,852,503 and 3,853,839, P. J. Magnino et al. describe a method for preparing an acid-stable soy protein product. The protein product is an aqueous slurry of soy protein which can be used directly as a component in processed foods (e.g., puddings), and can be dried to an acid-soluble powder.

In U.S. Pat. Nos. 3,891,777 and 3,891,778, R. A. Boyer describes a process for making cheeselike products from vegetable proteins. In this process, proteins derived from oil seeds (e.g., soybeans) are acid-precipitated to form a viscous curd, which is then processed to form a sliceable processed cheese product.

In U.S. Pat. No. 3,793,464, D. T. Rusch describes a process for preparing aqueous emulsions of proteins suitable for foods, in which the protein is coated with lipids in order to improve the taste and texture of the protein product, and to make it more palatable. The protein is first coated with the lipid layer, then dispersed in water.

In U.S. Pat. No. 4,734,287, N. S. Singer et al. describe a protein product based on dairy whey proteins which can be used as a fat substitute. The protein product produced by their method is composed of heat-labile particles of denatured dairy whey protein. In this process, whey proteins are heat-denatured under high shear conditions, and at low pH, to produce finely divided particles of denatured whey protein.

Proteins have also been used to encapsulate molecules. Encapsulation and microencapsulation have been widely applied in industry to protect the encapsulated material against light, oxygen, humidity, UV radiation and other hostile environments. Encapsulation can be employed to facilitate handling, to give protection against mechanical damage and to provide texture properties.

Microcapsules (i.e., microspheres) can range in size from tenths of a micron to several thousand microns, or larger. Currently available encapsulations use polymers as the encapsulant, such as polyacryldextrans (Edman et al , 1980, *J. Pharm. Sci.*, 69:838 and Artursson et al., 1984, *J. Pharm. Sci.*, 73:1507); or polyacrylamides (Ekman and Sjoholm, 1978, *J. Pharm. Sci.*, 67:693 and Ekman et al., 1976, *Biochem.*, 15:6115).

Microencapsulation is used in the food industry to improve the flavor, aroma, stability, appearance, nutritional value and texture of food products. With the increase in storage and transit time of processed food in industrialized countries, it is important to ensure nutritive value and sensory quality at least equal to the original food. In food applications, it is also important to have a safe, non-toxic, edible, biodegradable encapsulating material.

SUMMARY OF THE INVENTION

The invention relates to water-dispersible, water-insoluble protein microparticles, having a particle size of about 200 microns or less. For purposes of the present invention, the terms "microparticles", "microspheres" and "microcapsules" are used interchangeably. Water-insoluble, hydrophobic proteins derived from a variety of sources, including animal and plant sources, are processed to produce these protein microparticles.

The invention also relates to a process for making the protein microparticles. The method generally involves solubilizing the hydrophobic protein in an organic solvent or aqueous mixture thereof, a salt solution, or a solution having an extreme acidic or basic pH, and adding the resulting protein solution to an aqueous medium under conditions appropriate to precipitate the protein, and thereby to form a suspension of the protein microparticles. The process results in a stable, aqueous dispersion of protein microparticles. Microparticles produced by the method are uniform, spherical, water-insoluble, water-dispersible particles of non-denatured hydrophobic protein. The microparticles are heat stable and can be dried for transport and/or storage and then reconstituted, or hydrated, prior to use.

The properties of the microparticles can be controlled by varying the process parameters, such as the concentration of the starting protein solution, the rate of agitation, temperature and other variables.

Further, the protein can be modified prior to precipitation to enhance certain properties of the final product. The protein can be modified enzymatically, chemically or by other techniques. For example, the proteins can be treated with a protease (e.g., chymotrypsin, which affects the molecular weight of the proteins), or with an enzyme (e.g., transglutaminase which causes inter- or intra-molecular crosslinking of the protein). In addition, the amino acid residues of the protein can be hydrolyzed. In one embodiment, the number of charged amino acid residues can be increased by chemical or enzymatic modification. For example, glutamine and asparagine can be converted to glutamic acid and aspartic acid, respectively, by acid or base catalyzed deamidation.

The present microparticles can be used as a fat substitute in foods. In the proper concentration, an aqueous suspension of the microparticles mimics the physical and tactile properties of naturally occurring fats. This fat substitute can replace natural fats in the preparation and processing of many foods. Microparticles having a median particle size of from about 0.1 micron to about 4.0 microns are particularly useful as a fat substitute.

The microparticles can also be used as microcapsules in order to encapsulate small molecules or macromolecules. For example, a drug or pesticide can be added to the dispersion concurrently with the protein, and protein particles will be formed which encapsulate the molecule. The encapsulated molecule can then be employed in controlled release applications, such as drug delivery systems.

The protein microparticles of the present invention provide a natural, safe and cost-effective protein product for use in food, drug and cosmetic applications. The present process used to make the microparticles is simple, does not require prior denaturation of the proteins and results in uniform microparticles which form a stable, non-aggregating aqueous dispersion. The process allows considerable flexibility in production by varying the process parameters. In addition, a wide range of properties can be obtained by chemical or enzymatic modification of the proteins prior to processing. The protein microparticles can be dried to powder, which can be easily stored and handled. The powder can be readily reconstituted prior to use. The microparticles have excellent heat stability, which is important in the high temperature processing of foods.

BRIEF DEDSCRIPTION OF THE FIGURES

DETAILED DESCRIPTION OF THE INVENTION

Figure 1:
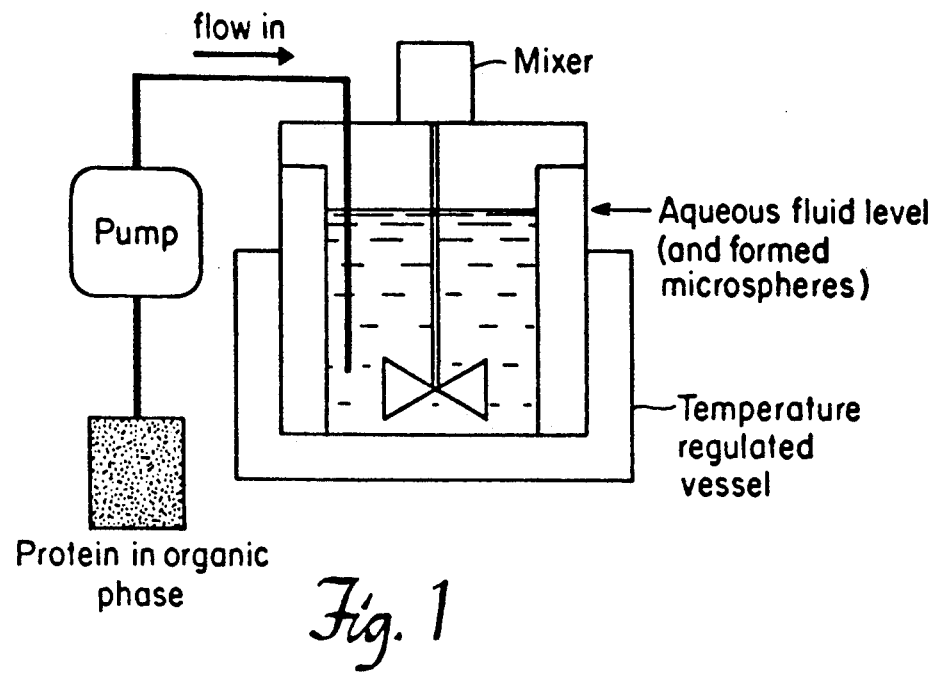
FIG. 1 is a schematic representation of a system which can be used for the batch production of protein microspheres by the "Fed Batch" method.

For the purpose of describing the present invention, the terms "microparticles", "microspheres" and "microcapsules" are used interchangeably, and as used herein, refer to small water-dispersible particles of water-insoluble hydrophobic protein having a median particle size of less than about 200 microns.

The term "water-dispersible" refers to micro. particles which are freely dispersible in an aqueous medium, to form a homogeneous substantially non-aggregated suspension of the microparticles. For purposes of the present invention, the term "aqueous medium" refers to water or a water-rich phase, such as a mixture of water and alcohol, containing at least 60% water by weight, in which the present microparticles are insoluble.

All percentages and ratios are by weight. unless specified otherwise.

The proteins used to make the microparticles of the present invention are water-insoluble, hydrophobic proteins. Water-insoluble hydrophobic proteins are proteins which, in their non-denatured state, are insoluble in water at room temperature and over a wide pH range (e.g., between about pH 2-pH 10). For purposes of describing this invention, a protein is insoluble in water if less than about 0.5% (weight to volume) of the protein dissolves in water under the aforementioned conditions.

Microparticles produced by the method of the present invention include uniform, water-insoluble, water-dispersible, spherical particles of nondenatured, hydrophobic protein. The microparticles are heat stable and can be dried, and reconstituted, if desired, prior to use.

The preferred proteins are hydrophobic grain proteins known generally as prolamines. Prolamines are characterized by their insolubility in water and solubility in aqueous alcohol (e.g., aqueous solutions of water and ethanol or 2-propanol, for example, containing at least 40% alcohol), and by the presence in the protein of large amounts of hydrophobic amino acids such as proline, glutamine and asparagine. The unusual solubility characteristics of prolamines is based on the fact that they are usually deficient in polar amino acids.

Prolamines are found in high concentrations in various grains, such as corn, wheat, barley, rice and sorghum, and in other plants and animal sources. The amount of prolamines in selected grain seeds is shown in Table 1.

TABLE 1

| Sources for Prolamines | | |
|---|---|---|
| Source | Prolamine | % by weight of Seed Protein |
| Common Wheat | Gliadin | 45 |
| Durum Wheat | Gliadin | 60 |
| Barley | Hordein | 40 |
| Maize (corn) | Zein | 60 |
| Sorghum | Kafirin | 60 |

A preferred prolamine for use in the present composition and method is the alcohol-soluble protein fraction of corn (*Zea mays*), named zein. The potential yield of zein is about one pound per bushel of corn. Zein can be readily obtained from corn gluten, which is a by-product of the corn wet milling industry. Both commercially available grades, with associated impurities, and purified forms of zein can be used.

Zein is characterized by a relative deficiency of reactive groups, compared to most proteins. See, e.g., L. C. Swallen, "Wein-A New Industrial Protein", (1941) *Ind. and Eng. Chem.*, 33:394-398, hereby incorporated by reference herein. Based on a dimer molecular weight of approximately 38,000 daltons, it contains only twelve free acid groups per molecule. The amino acid content of zein is set out in Table 2.

TABLE 2

| Amino Acid Content of Zein | |
|---|---|
| Amino Acid Type | No. of Amino Acids per dimer of zein |
| Ionizable | |
| lysine | 1 |
| arginine | 11 |

TABLE 2-continued

Amino Acid Content of Zein

| Amino Acid Type | No. of Amino Acids per dimer of zein |
|---|---|
| histidine | 9 |
| tryptophan | 0 |
| glutamic and aspartic acids | 22 |
| Polar | |
| serine | 48 |
| threonine | 25 |
| tyrosine | 31 |
| glutamine and asparagine | 202 |
| Nonpolar | |
| glycine | 18 |
| alanine | 120 |
| valine | 36 |
| methionine | 3 |
| isoleucine | 28 |
| leucine | 166 |
| phenylalanine | 54 |
| Sulfhydral-disulfide | |
| half cystine + cysteine | 7 |
| Secondary | |
| proline | 101 | see, J. Weychick and J. Boundy, (1963) *In: Symposium on Foods and Proteins and Their Reactions*, 317, H.Schultz and A. Anglemeir, (eds), Avi Publishing Co., hereby incorporated by reference herein.

Prolamines are soluble in extremely acidic or alkaline solutions and in aqueous mixtures of organic solvents which belong to the following classes: hydroxy compounds (e.g.. ethanol, 2-propanol or glycerol), ketones (e.g., acetone, methyl ethyl ketone) and amides (e.g., acetamide). Prolamines are soluble in aqueous mixtures of these solvents which contain no more than sixty (60%) percent by weight water. The "solubility" of a protein is defined as grams of protein totally dissolved in a given amount of solvent at a certain temperature. A protein is considered soluble in a solvent if more than about 0.5% (w/v) protein dissolves in the solvent to form a transparent solution. Maximum solubility is the point at which the solution begins to turn from transparent to translucent or turbid. Turbidity can be determined visually, or measured with a nephelometer or spectrophotometer using the method described by Preston in "Effects of Neutral Salts upon Wheat Gluten Protein Properties. I. Relationship Between the Hydrophobic Properties of Gluten Proteins and Their Extractability and Turbidity in Neutral Salts", *Cereal Chemistry*, 58:317 (1981), hereby incorporated herein by reference. As an example, hydrophobic proteins used in the present process would not form a clear solution in water at concentrations of over 0.5% (w/v). The temperature range for measuring solubility can be between about 5° C. to the boiling point of the solvent or solvent mixture, but is preferably measured at room temperature, about 20° C.

Prolamines are also soluble in aqueous solutions of inorganic, neutral, monovalent salts (e.g., sodium, potassium, lithium) or divalent salts (e.g., calcium or magnesium) of lyotropic anions (e.g., fluoride, chloride, bromate, bromide, chlorate, iodide, isothiocyanate), in concentrations between about 0.1N to 6N. In addition, prolamines can be dissolved in highly alkaline solutions, e.g., having a pH of about 10 or above or acidic solutions, e.g., having a pH of about 2 or below.

The preferred solvents for prolamines, including zein, are aqueous solutions of ethanol or 2-propanol which contain at least 40% alcohol. Prolamines are soluble in 60:40 mixtures of water/2-propanol in amounts between about 0.5-50% (w/v) protein, over a temperature range of about 5-70° C; and in 60:40 water/ethanol in amounts between about 0.5-30% (w/v) protein, over a temperature range of about 5-70° C. In a preferred embodiment, a solution of aqueous ethanol is used containing from about 70 to about 90% ethanol; that is, having a water:ethanol ratio of from about 30:70 to about 10:90.

The ability to form microparticles (or microspheres) depends upon the differential solubility of the protein in water-miscible organic solvents, salt solutions, acidic or basic solutions as compared to their solubility in water or a water-rich phase. Hydrophobic proteins are soluble (> 0.5 mg protein/ml solvent) in mixtures of organic solvent and water having about 60% by weight or less of water, in salt solutions having concentrations from about 0.1N to 6N, and in extremely acidic or basic solutions (having a pH of about 10 or above or 2 or less). They are not, however, soluble in pure water or in organic solvent:water mixtures having greater than 60% water. The methods of production of the microparticles utilize these properties in that the protein is dissolved in an organic/aqueous solvent, acid, base or salt solution which in turn is added to rapidly stirring water or a combination of water and additives. Upon mixing, the water-miscible organic solvent, acid, base or salt solution comes to a rapid equilibrium with the aqueous phase in the reactor leading to the subsequent precipitation of the protein due to its insolubility in water. In one embodiment of the present method, the protein is dissolved in a highly alkaline solution which is added to a lower pH medium, such as water, causing the protein particles to precipitate. An acid, such as HCl, can be added to reduce and maintain the pH of the lower pH medium.

The suspension of microparticles can be produced by rapidly mixing and dispersing the protein solution into an aqueous phase. Efficient mixing can be achieved by fast mechanical stirring with a propeller or impeller blade, and/or by using a baffled reactor to prevent laminar flow. The hydrophobic proteins are insoluble in the aqueous phase, and will precipitate, thereby forming a suspension of microparticles.

Three basic production techniques which are based on the principles mentioned above have been used in the production of the present microspheres. The basic flow diagrams for these methods are provided in FIGS. 1 through 3.

An apparatus for the "Fed Batch" method for the production of microspheres is schematically illustrated in FIG. 1. The apparatus involved is a baffled, temperature controlled vessel, a pump, and a vessel containing the protein (1 to 50% w/v) in an organic phase which has no more than 40% water by weight or in acid, base or in salt solutions having a concentration greater than 0.1N. The water or protein solution can contain additives (such as, e.g., carbohydrates, oils, phosphates, emulsifiers or surfactants), to control size, agglomeration and/or surface properties for the intended use of the microparticles. The protein 'feed' tube is positioned in an area of high agitation in the vessel, and the aqueous solution is rapidly stirred at a level between 1 and 50 horsepower (hp) per 1000 gallons. The protein solution is then rapidly pumped into the reactor where the protein precipitates into microparticles, the size of which is determined by the conditions found in the reactor (i.e., pH, temperature, residence time, protein concentration in the feed, agitation, additives, etc.). However, during the batch process the concentration of particles and protein solvent increase with the length of the production run. If a low-boiling organic solvent is used, the concentration of the solvent in the precipitate can be controlled by evaporation. If acid, base or salt is used to solubilize the protein the concentration of acid, base or salt can be controlled through diafiltration of the reactor fluid during the course of the precipitation, or, in the case of acid and base, by pH adjustment.

Figure 2:
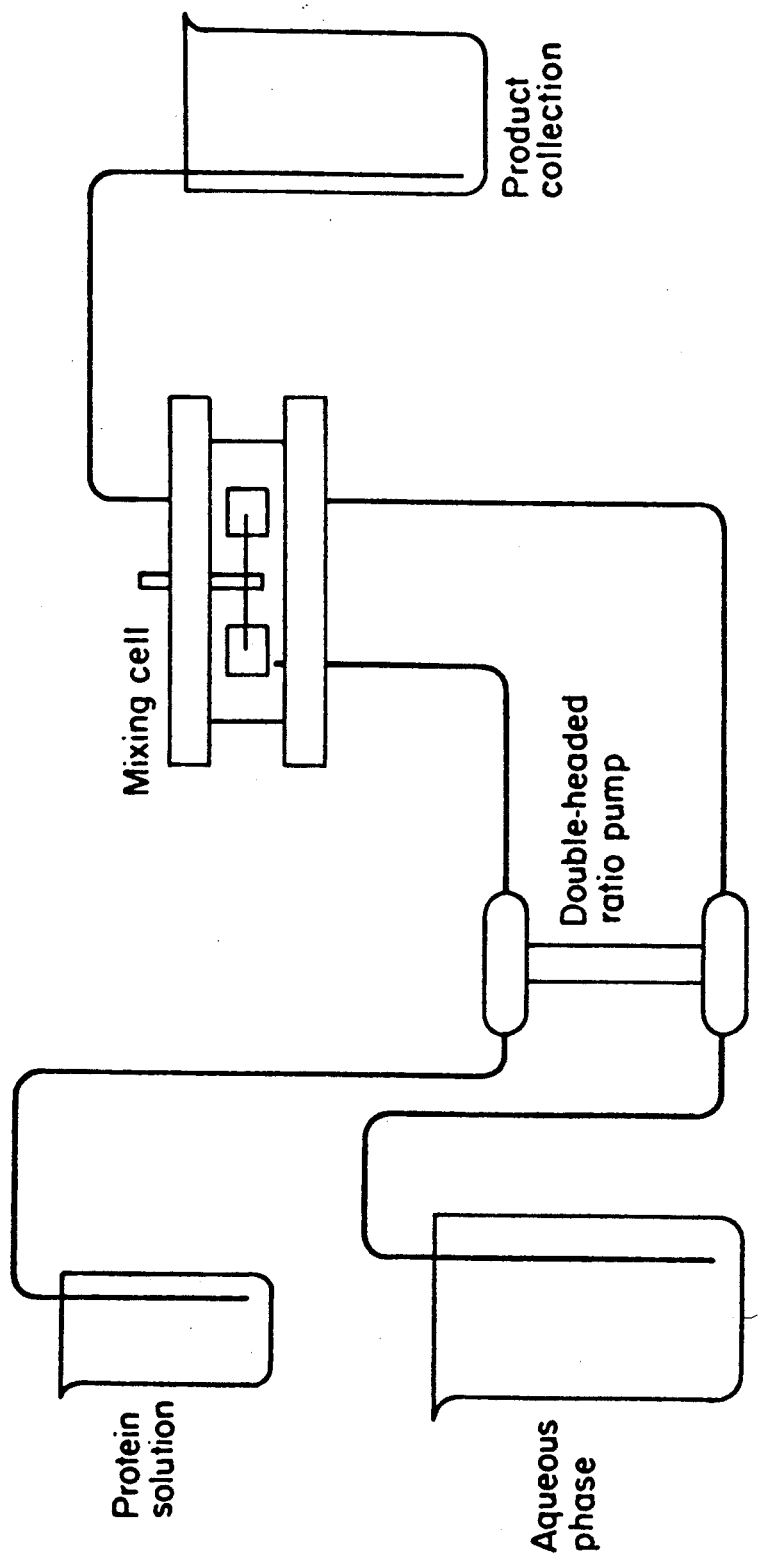
FIG. 2 is a schematic representation of a flow-through mixing system which can be used for production of protein microspheres by continuous precipitation.

FIG. 2 schematically illustrates an apparatus for a flow-through mixing system to be used in a continuous precipitation process. The apparatus includes: a temperature controlled, baffled (optional) mixing cell (precipitator) and three vessels containing: the aqueous phase, protein dissolved in solvent, and a product collector, respectively, and pumps to control the input of the materials into the precipitator. In the continuous process, the microparticles are formed and properties controlled as in the fed batch process with the exception that the concentrations of the protein, solvent and particles are constant over the length of a production run allowing greater control and uniformity of the final particle properties. The residence time in the mixing cell (precipitator) is equal to the volume of the reactor divided by the effluent flow rate. Typically the residence times range from 0.1 seconds or less, to about one hour.

Figure 3:
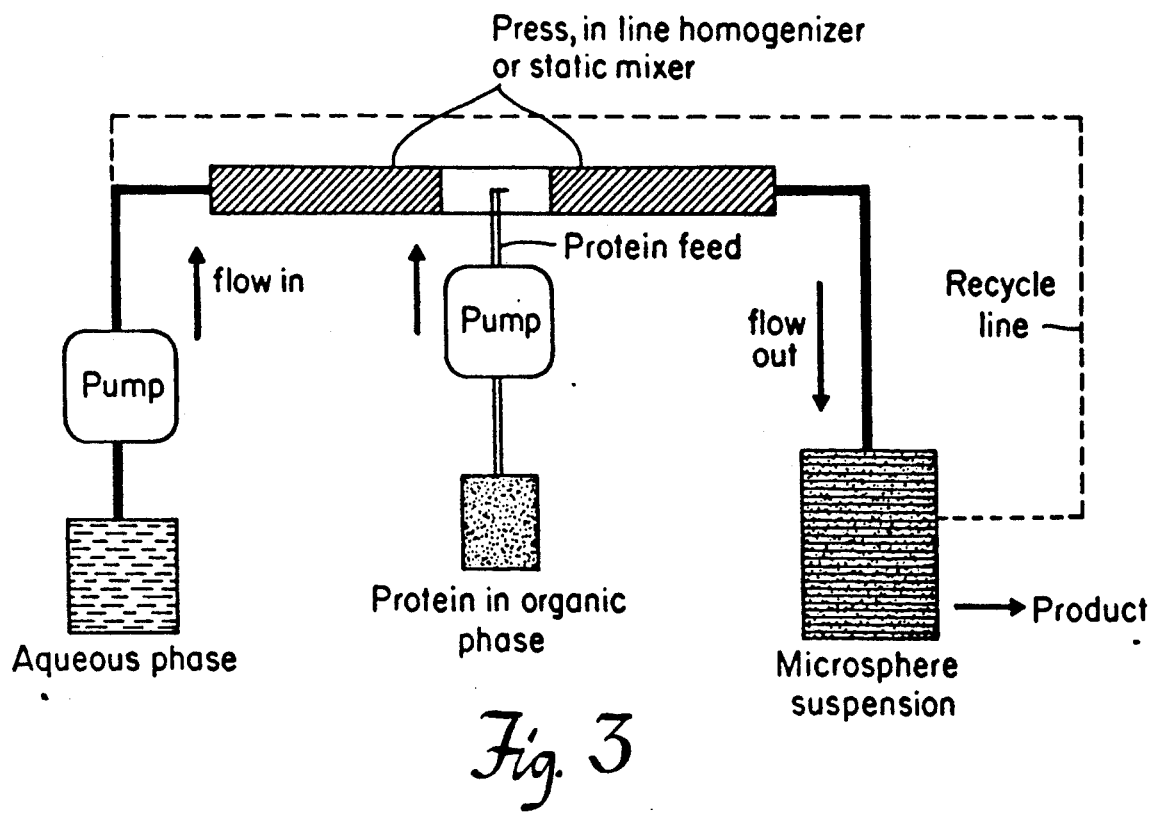
FIG. 3 is a schematic representation of a reaction system, which can be used for continuous production of the protein microspheres by the "Plug Flow Precipitation Method".

Another method of continuous production is the "Plug Flow Precipitation" method. An apparatus for this method is schematically illustrated in FIG. 3. In the plug flow method, the aqueous phase is pumped through a temperature regulated in-line mixing device. The protein solution is pumped into the center of the mixer where it is rapidly stirred into the aqueous phase leading to the formation of microspheres. As in the other two methods, additives in either phase, temperature, protein feed concentration, rate of mixing, etc. can be controlled to produce particles having the desired size and properties for a particular application. In this mode of production the residence time can be, typically, from about 0.01 seconds to 30 minutes.

The methods described above can be modified to encapsulate, or incorporate into the microspheres, various materials such as drugs, flavors, proteins or other substances. For example, the apparati shown in FIGS. 1-3 are useful for encapsulation. In these apparati, the protein feed tube is positioned above the surface of the mixing aqueous phase. The material to be encapsulated is dissolved in either the aqueous or organic phase as dictated by the solubility of the material. The formed microspheres will have incorporated throughout the sphere the material to be encapsulated. The size and properties of the microcapsules will be subject to the same controlling parameters as described above.

The concentration of microspheres in suspensions produced by the methods described is typically between 0.1 to 10% by weight. The suspension may be further concentrated to up to 40% by weight by ultrafiltration, evaporation or other appropriate techniques, or reduced to a dry powder, using standard techniques such as flash drying, lyophilization or spray drying. For example, the material from the precipitator (the suspension of protein microspheres) can be concentrated to between about 20 and 40% by weight by evaporation and/or ultrafiltration. The concentrated protein can then be diafiltered to reduce the amount of residual solvent to trace amounts. The diafiltration can be done continuously by staged addition of solvent or in a batch mode by constant volume batch diafiltration.

Precipitation of the protein can be controlled by altering the following parameters:

1) Temperature of the precipitation: Higher temperature during the precipitation process has the effect of forming smaller microparticles. The upper temperature limit is determined by the boiling point of the system, and by the denaturation and solubility characteristics of the proteins in the supernatant after precipitation. The preferred temperature range is between about 0–90° C.

2) Agitation: The rate of agitation (the Reynolds number of the aqueous phase) is an important parameter in controlling the precipitation of the protein. Faster mixing and dilution of the protein feed solution into the aqueous phase results in less chance of aggregation and formation of large agglomerates. In general, experiments in batch processes have shown that fast mechanical stirring in baffled containers gives the most efficient formation of homogeneous spheres in the suspension.

3) Protein concentration: Increasing the protein concentration in the protein feed solution generally has the effect of increasing the size of the microspheres. The preferred range of the protein concentration is about 5–15% (w/v).

4) Anti-aggregating Reagents: Aggregate blocking reagents, such as gums and/or surface active agents, can be added to stabilize the suspension. Preferred blocking reagents include various polysaccharides, such as gum arabic and carboxymethyl cellulose (CMC). These compounds exist as slightly acidic salts and interact with the positively charged regions on the exterior of the protein molecules, thereby stabilizing the microspheres. A preferred amount of these gums in the aqueous phase is up to about 0.2% (w/v).

Other stabilizers, such as lecithin, DATEMesters (diacetyl tartaric acid esters of mono- and di-glycerides), polysorbates, sodium stearate,. potassium oleate, sodium phosphate, pyrophosphates, and sodium docecyl sulfate (SDS), can also be used.

Anti-aggregating agents are not necessary during the formation of the prolamine microspheres if the pH of the aqueous phase is below about pH 6, or above about pH 7. The best results are obtained when both the aqueous phase and the prolamine solution are adjusted to about pH 2.5. (See Example 14).

The protein microspheres produced by the present precipitation methods generally have a particle size of less than about 20 microns. These microspheres are comprised of non-denatured, water-insoluble, hydrophobic proteins, and form a stable suspension in an aqueous medium. In a preferred embodiment of the present composition and method, the precipitated microspheres have a median particle size of less than about 10 microns. The term "median particle size" refers to a volumetric distribution of particle sizes, such that of the total volume of particles present, 50% of that volume is comprised of particles having diameters less than, and 50% having diameters greater than, the median size. In a more preferred embodiment of the present composition and method, the precipitated microspheres have a median particle size of less than about 4.0 microns. Microspheres having a median particle size of less than about 4.0 microns are particularly useful as fat substitutes. Particle sizes are measured by a Microtrac Small Particle Analyzer. (Leeds & Northrop Instruments, North Wales, PA).

The concentration of protein microspheres in the suspension after precipitation generally ranges from about 0.1% to about 10% by weight of the total volume of suspension. More concentrated suspensions may be desirable. If so, the suspension can be concentrated by an appropriate method, such as ultrafiltration and/or vacuum evaporation. Ultrafiltration using membranes having a cut-off of 500,000 NMWL (nominal molecular weight limit) or less is a preferred method of concentrating the suspension and, at the same time, removing low molecular weight compounds dissolved in the supernatant. The concentration of the suspension by ultrafiltration can be up to about 40% (w/v) protein, or more.

The concentrated suspension can, optionally, be dried to a powder. This can be accomplished by placing the suspension in a lyophilizer at an appropriate temperature (e.g., room temperature), at a pressure of about 10-60 millitorr (mtorr) until the water and other volatiles have a been evaporated (to about 1-10% moisture content), and a fine powder remains. Alternative forms of drying, such as flash drying, fluid-bed drying, spray drying or vacuum drying can be used. This powder can then be stored and handled without refrigeration or other special handling procedures. Rehydration can be accomplished by adding the powder to water, or an aqueous medium, with agitation sufficient to resuspend the protein particles and form a suspension. The ratio of powder to water will depend upon the concentration of the final reconstituted product which is desired. For use as a fat substitute, a suspension with a protein:water ratio of up to about 40:60 (w/v) is preferred.

The properties of the suspension can be modified for a given application, for example, by chemically and/or enzymatically altering the starting protein prior to precipitation. Such modifications can produce a protein having enhanced thermal stability, surface reactivity and shear stability. The functionality, surface properties and molecular weight distribution of the protein can be modified by hydrolysis with proteases, such as papain or chymotrypsin, to yield peptides having similar solubility characteristics as the untreated protein. A change in the molecular weight distribution of the starting protein causes a variation in the particle size of the product. Enzymatic hydrolysis can be carried out prior to making the suspension. The degree of hydrolysis can be controlled by varying the amount of enzyme used or the reaction time during which the protein is exposed to the enzyme. Enzymatic hydrolysis of zein in 90% ethanol using a protease (e.g., papain or chymotrypsin) yielded polypeptides with a molecular weight of about 1,000 daltons. Unmodified zein has a dimer molecular weight of about 38,000 daltons. More importantly, the hydrolysate retains the solubility characteristics of the protein, i.e., the polypeptides are still insoluble in water but soluble in 90% ethanol.

The properties of the product can be influenced by chemical modification of the proteins. Such modifications can include, for example, treating the proteins with an acid, base or other agent which alters the structure of one or more amino acid side chains, which, in turn, alters the character of the protein. For example, the high glutamine and asparagine content of prolamines, particularly zein, provides a means for manipulating the charge characteristics of the protein by deamidation, thereby providing a wide range of hydrophobicity. The preferred deamidation method involves mild acid-catalyzed deamidation (at a pH of about 1) at elevated temperatures (e.g., 25-65° C.) for a period of time sufficient to accomplish the desired level of deamidation. The deamidation process may be followed by measuring the release of ammonia with an ammonia electrode. Deamidation is controllable, and may be terminated by the addition of ammonium carbonate or other base (see Example 12). Other examples of chemical modification include esterification of the protein with fatty alcohols, or acylation of the protein with fatty anhydrides, which can alter the acid (or base) sensitivity of the protein product.

The thermal stability of the protein can be enhanced by crosslinking the protein prior to precipitation by the addition of an enzyme which catalyzes intra- and/or intermolecular crosslinking of the protein, such as transglutaminase, or protein disulfide isomerase. Transglutaminase and protein disulfide isomerase cause inter- and intramolecular crosslinking of the protein through the amino acids glutamine and cysteine, respectively. Transglutaminase catalyzes an acyl transfer reaction, in which the amide group of the amino acid glutamine is the acyl donor.

Thermal stability is particularly important for a fat substitute to be used in baking, or other high temperature food processes. Thermal stability of the microparticles can be enhanced by adding oils and/or surfactants. For example, to a suspension of the microparticles prepared as described herein above, an oil such as soybean oil, or surfactants, such as monoglyceride esters, can be added to form a stable suspension having improved thermal stability over a suspension which does not contain an oil or surfactant (See Example 16). The amount of oil or surfactant which is added is the amount necessary to improve the thermal stability and form a stable emulsion, generally about 1.0% by weight of the protein.

The present protein-based suspensions can be used in various applications in the food industry, including as replacements for fats in foods. Microparticles having a median particle size of up to about 4.0 microns are useful as fat substitutes.

To be acceptable as a fat substitute, a fat substitute should closely approximate the organ. oleptic attributes (i.e., sensory impression) of the fat to be replaced. The most important organoleptic attribute is "mouth-feel". Mouth-feel consists of the collection of sensory impressions (e.g., smoothness, creaminess, grittiness, lubricity) which a substance creates in the mouth of an individual tasting the substance. Natural fats form a layer or coating on the tongue. This coating property, as well as the creamy, smooth texture of natural fats, must be reproduced by the fat substitute. These fat-like properties are reproduced by an aqueous suspension of the protein microparticles described herein.

Hydrophobic proteins are particularly suited for use in fat substitutes, because the physical characteristics of hydrophobic proteins are similar to those of fats. For example, hydrophobic proteins, such as prolamines, exhibit less interaction with aqueous media. Prolamines can form films, which is a fat-like property. The ability of a fat substance to leave a coating in the mouth is part of the organoleptic character that contributes to the mouthfeel associated with fats.

The present composition is particularly useful in producing reduced-calorie, reduced-fat food products. The microparticles, in dry form or as a suspension, can be substituted for a significant portion of the fat in selected food formulations. The extent of substitution can be up to about 100% and is generally from about 50 to 100%. The amount of the present fat substitute which is used to replace the fat in a selected food product can be defined in terms of "fat equivalence". "Fat equivalence" is defined as the ratio of the weight of dry microspheres in the fat-reduced formula to the weight of fat removed from a control formula. In a preferred embodiment of the present invention, the fat equivalence will range from about 0.10 to about 0.50, where the balance is made up with water or an aqueous medium. For example, in a selected food formulation, if 10 g of fat is replaced with 5 g of dry microspheres, an aqueous dispersion of microspheres containing 5 g of dry microspheres and 5 g of water is added, producing a product having a fat equivalence of 0.50. That is, the formulation contains 5 g of dry microspheres, and 5 g of water, for 10 g of fat removed. More or less fat substitute can be used in a selected formulation depending upon the amount of fat reduction desired and the individual formulation.

The present protein microparticle compositions are heat and cold stable, thus, can be used in frozen food (e.g., frozen desserts) or cooked food (e.g. frankfurters) applications. For example, the microparticles have been shown to be stable under pasteurization conditions (63° C. for 30 minutes). Foods having a high fat content (e.g., margarine), low pH (e.g., sour cream), or a low water activity (e.g., frosting) can be formulated as reduced-fat foods by substituting some or all of the fat in the formulation with the present protein microspheres. Specific examples of a variety of reduced fat food products which have been formulated utilizing the present protein microparticles are shown in Examples 17 through 25. These include frostings, pourable and spoonable dressings, frozen desserts, margarine spreads, frankfurters, low-fat milk-based beverage, peanut spread and a sour cream-like product.

Preferably, the fat substitute should impart neither significant flavor nor color, so that it does not substantially alter the flavor or appearance of the food product. Some commercial preparations of prolamines may impart a yellow color to the protein suspension or may have an objection. able odor and/or flavor. To eliminate this problem, the proteins may be decolorized and/or deflavored. Decolorizing can be done prior to making the suspension. Decolorizing can be accomplished by known techniques for removing selected substances, such as extraction with organic solvents (e.g., acetone, hexane or methanol). Decolorizing can also be effected by passing the protein feed solution through a column, or other appropriate container, packed with an adsorbent, such as activated charcoal or a polymeric resin. For this purpose, non-polar, neutral, macroporous polymeric beads having a high surface area (e.g. from about 100 to about 1000 square meters per gram) can be used. Macroporous polystyrene or styrene divinylbenzene copolymer beads having a pore size from about 10 to about 200 angstroms, are preferred. In one embodiment, the prolamine is dissolved in alcohol at a concentration of about 2 to about 40% and run through a column containing polystyrene beads at a space velocity of 2 l/hr per gm of beads. This procedure removes the color from the protein and passes the protein with a recovery of over 95%.

Deflavoring the protein removes the "grassy" or "grainy" flavor and/or odor which may be present in some proteins. One deflavoring method is to extract the dried protein with solvents such as ethanol, methanol, acetone, hexane or mixtures thereof. The solvent can then be removed from the prolamine by filtration and drying. Deflavoring can also can be accomplished by ultrafiltration. For this purpose, membranes having a pore size less than about 30,000 NMWL can be used. In one embodiment, the protein suspension is deflavored by filtering the suspension through a 30,000 NMWL hollow fiber filter cartridge. Protein microparticles treated with ultrafiltration exhibited reduced odor and flavor.

Uniformity of particle size is particularly important for substances to be used as fat substitutes, since the presence of large particles or aggregates of particles, can contribute to a chalky, gritty texture that is unacceptable in terms of the mouthfeel of the product. The present microparticles are substantially uniform in size, that is, the distribution of particle sizes is narrow and substantially gaussian. A protein suspension produced by the present process, having a concentration of microspheres of from about 10 to about 40 percent, by weight of the protein, as required or determined by end use, has a fat-like mouthfeel and good organoleptic properties.

The present suspension can be used as a low-calorie, cholesterol-free fat substitute in many processed food preparations by directly substituting the suspension for the same amount of fat in the processing of food. The content and formulation of the food product will be determined by the nature of the food product, its end use, and the sensory qualities desired by the manufacturer.

The protein microparticles of the present invention can also be used to encapsulate or incorporate various materials, such as drugs, cosmetics, pesticides, flavors or other substances. For example, microcapsules have been used as carriers for proteins and drugs in vivo. A system used as an in vivo drug carrier must be biocompatible, and non-toxic; it must be biodegradable and should not induce an antibody response. Protein microspheres of the present invention are particularly suited to in vivo delivery systems because the protein is a natural, safe, non-toxic substance. Microcapsules made by the present process can also be used to encapsulate flavors which can then be added to foods. Encapsulated pesticides can be made which would be taken up by the pests, and released in vivo.

The microspheres formed by the process of the invention are ideal for encapsulation purposes. Encapsulation of a substance within the microspheres is accomplished by the process described hereinabove.

The invention is further illustrated by the following examples.

EXAMPLE 1

Formation of a Protein Suspension from Zein

A solution was prepared by dissolving 1.0 g of zein (regular grade, F-4000, Freeman Industries, Inc., Tuckahoe, NY) in 12.5 ml of 90% ethanol (v/v) (Pharmco Products Inc., Norwalk, CT) and heating to 40° C. In a separate 125 ml beaker equipped with baffles and a magnetic stirrer, 200 mg of gum arabic (Nutriloid Arabic Gum, TIC Gums, Inc., Belcamp, MD) was dissolved in 100 ml water. The resulting solution was heated to 70° C. The zein solution was added to the gum solution at a flow rate of 20 ml per minute via a syringe needle which was submerged into the rapidly stirring aqueous solution. A suspension formed immediately. The suspension was filtered through Whatman No. 1 filter paper in order to remove particulate impurities. The final concentration of zein was 0.89% (w/v).

EXAMPLE 2

Formation of a Protein Suspension from Zein

A solution prepared by dissolving 1.0 gram of dry zein powder (regular grade F-4000) in 99 g of 90% (v/v) non-denatured ethanol and the solution was heated to 40° C. In a separate reaction vessel equipped with a magnetic stirrer, 800 mg of gum arabic was dissolved in 800 ml of deionized water and the solution was heated to 60° C. on a stirring hotplate. The warm zein solution was pumped into the stirring gum solution at a rate of 1.5 ml per minute, to form a suspension of microparticles. The suspension was filtered through Whatman No. 1 filter paper in order to remove particulate impurities. Particle size and shape were determined by light and electron microscopy and laser scattering. The results indicated spherical particles having a median particle size of about 0.23 microns. The final concentration of zein in the suspension was 0.11% (w/v).

EXAMPLE 3

Use of Anti-Aggregating Agents

To assess the efficacy of various anti-aggregating agents suspensions of zein were produced according to the method described in Example 1, adding the various anti-aggregating agents set out below. Stable suspensions were formed. The following compounds were added and were found to prevent aggregation:

| Compound | mg/ml suspension | % of total solids |
|---|---|---|
| Gum Arabic (TIC Gums, Inc.) | 2.0 | 17% |
| Gum Ghatti (TIC Gums, Inc.) | 1.5 | 13% |
| Lecithin (Soy Refined, United States Biochem. Corp., Cleveland, OH) | 2.0 | 17% |
| Sodium Dodecyl Sulfate (Polysciences. Inc., Warrington, PA) | 0.1 | 1% |
| Sodium Phosphate (pH = 8.0) J. T. Baker Chemical Co., Phillipsburg, NJ) | 5.0 | 33% |

EXAMPLE 4

Alteration of the Particle Size

Method 1

A solution was prepared by dissolving 1.0 g of zein in 12.5 ml of 90% ethanol and heating the solution to 70° C. In a separate 125 ml beaker equipped with baffles and a magnetic stirrer, 200 mg of gum arabic was dissolved in a mixture of 100 ml water and 30 ml of ethanol, and heated to 70° C. The zein solution was added to the gum solution at a flow rate of 20 ml per minute through a syringe needle which was submerged into the rapidly stirring aqueous solution. A light suspension formed immediately, and upon slow cooling to 5° C., additional material precipitated. The suspension was filtered through Whatman No. 1 filter paper to remove large particulate impurities. Inspection with both light and electron microscopes revealed spherical particles having a particle size of 3-5 microns.

Method 2

A solution was prepared by dissolving 1.0 g of zein in 12.5 ml of 90% ethanol and 0.5 ml glycerol (Aldrich Chemical Co., Inc., Milwaukee, WI) and heating the resulting mixture to 40° C. In a separate 125 ml beaker equipped with baffles and a magnetic stirrer. 200 mg of gum arabic was dissolved in 100 ml water and heated to 70° C. The zein solution was added to the gum solution at a flow rate of 20 ml per minute through a syringe needle which was submerged into the rapidly stirring aqueous solution. A suspension formed immediately. The suspension was filtered through Whatman No. 1 filter paper to remove particulate impurities. Inspection with both light and electron microscopes showed the particles to be spherical having a particle size of 0.1-0.2 microns.

EXAMPLE 5

Concentration and Drying of the Protein Suspension

A filtered suspension prepared according to the method set out in Example 1 was concentrated, then reduced to a dry powder, through the following procedure: 800 ml of said filtered suspension was concentrated to a volume of 100 ml, using a 30,000 NMWL, (Model AGF60, Fresenius, Chem. Pharm. Ind. KG, Taunus, FRG) or 100,000 NMWL (Model HIP100, Amicon, Corp., Danvers. MA) hollow fiber cartridge by following the manufacturers instructions. The resulting suspension was dried to a powder using the following procedure: A 100 ml aliquot of the suspension was cooled to −20° C., then placed into a lyophilizer at a vacuum of 40 mtorr, at room temperature for 12 hours and a dry powder was obtained.

EXAMPLE 6

Deflavoring the Suspension

Protein suspensions prepared from zein may have a "grainy" flavor and or odor. The flavor and odor were removed by the following procedure: 900 ml of the suspension prepared according to the procedure set out in Example 1 was concentrated to 100 ml using a hollow fiber filter cartridge (Polysulfone F- 60, Fresenius Chem. Pharm. Ind. KG). The volume was then brought to 400 ml with deionized water, and the volume was again reduced to 100 ml using the hollow fiber cartridge. The procedure was repeated, and the final filtrate was freeze dried as described in Example 5. The dried powder exhibited reduced odor and flavor compared to the starting material.

EXAMPLE 7

Decolorizing the Protein

A zein solution prepared from a commercial protein can be decolorized by the following procedure: One gram of dry zein powder was dissolved in 100 ml of 90% ethanol forming a yellow, transparent solution. This solution was passed through a column, 15 cm in length and 1 cm in diameter, packed with macroporous styrene-divinylbenzene beads (Bio-Beads SM16, 20-50 mesh, Bio-Rad Laboratories, Richmond, CA), at a flow rate of 0.5 ml per minute. A yellow material was retained on the top of the column and the eluate contained the decolorized zein. A suspension of protein microparticles was prepared according to the procedure set out in Example 1 in which decolorized zein solution obtained from the column was substituted for the solution of raw zein in alcohol. A white suspension was obtained having physical characteristics similar to the suspension of Example 1.

EXAMPLE 8

Preparation of a Decolorized and Deflavored Suspension

Using a decolorized zein solution as described in Example 7, a suspension was made according to the procedure set out in Example 1. This suspension was deflavored as described in Example 6. Inspection with both light and electron microscopes showed the particles to be spherical, with a median particle size of about 0.2–0.4 microns. The suspension was concentrated and dried as described in Example 5 to yield a white powder having reduced odor and flavor compared to the non-treated suspension of Example 1.

EXAMPLE 9

Preparation of Protein Microspheres Using Wheat Prolamines

Gliadin, the prolamine in wheat, was isolated from wheat gluten by suspending 40 g of wheat gluten (Sigma Chemical Co., St. Louis, MO) in 360 ml of 70% (v/v) ethanol-water at ambient temperature to form a slurry. This slurry was stirred approximately 5 minutes to allow the gliadin to dissolve. The mixture was then centrifuged at 8000 g for 1 hour to remove all of the insoluble matter. The gliadin was recovered from the supernatant by first concentrating the solution to approximately 1/4 of its original volume via vacuum evaporation, and then by lyophilizing the concentrate, according to the procedure set out in Example 5.

Gliadin microspheres were formed by redissolving 7 g of the gliadin in 100 ml of 70% (v/v) ethanol-water at 50° C. This solution was pumped into an agitated, baffled beaker containing 400 ml of an aqueous solution containing 2.22 g gum arabic and 2.22 g medium viscosity sodium carboxy-methyl cellulose (CMC., Sigma Chemical Co.). The resultant suspension contained particles with a median particle size of 3.3 microns (80% of the particles fell between 0.7 and 9.42 microns) as measured on a Microtrac Small Particle Analyzer (Model 7995-30, Leeds & Northrup Instruments, North Wales. PA). This suspension had a pH of 5.90 and a conductivity of 188 micromho.

EXAMPLE 10

Microsphere Formation by pH Adjustment

Protein microspheres can also be formed by dissolving the prolamines at high pH, followed by precipitation into a lower pH medium. In this method, zein was dissolved by adding 7 g of zein to 100 ml 0.1 N NaOH at 50° C. The microspheres were formed by pumping this zein solution into an agitated, baffled beaker containing a 400 ml aqueous solution of 0.32 g gum arabic and 0.32 g medium viscosity sodium CMC maintained at 70° C. During the addition of the zein solution, the pH of the suspension was maintained between pH 4 and pH 6 by the dropwise addition of 1.0 N HCl.

The resulting suspension was cooled to 4° C., and then filtered through a bed of glass wool to remove large particulate matter. The suspension contained microspheres with a median particle size of 0.89 microns (80% of the particles had a particle size between 0.40 and 2.40 microns) as measured on a Microtrac Small Particle Analyzer.

EXAMPLE 11

Production of Microspheres Using a Continuous Mixing Cell

A zein solution was formed by dissolving 49 g of zein in 700 ml of 90% (v/v) ethanol-water at 50° C. This solution was combined with a 2800 ml aqueous solution containing 2.72 g gum arabic (TIC Gums, Inc.), and 2.72 g medium viscosity sodium CMC (Sigma Chemical Co.) in a flow-through mixing cell to form the microspheres. The cell was mechanically agitated with a 5 cm turbine-type impeller rotating at 500 rpm. The average residence time in the cell was 8 seconds. The resulting suspension of microspheres had a median particle size of 0.42 microns (80% of which were between 0.18 and 1.32 microns). The suspension was cooled to 4° C., filtered through glass wool, and then concentrated on an ultrafilter. Ultrafiltration was done on a 5 ft$^2$, polyether. sulfone, 100,000 NMWL membrane (Novasette system, Filtron, Inc., Clinton, MA), concentrating the suspension from 3500 ml to approximately 1000 ml. This concentrate was diafiltered with 3000 ml water. The suspension was further concentrated on a 0.5 ft$^2$, regenerated cellulose 300,000 NMWL membrane (Minitan system, Millipore, Inc., Bedford, MA) to a final volume of about 150 ml, and a solids content of approximately 25%.

The concentrated suspension was frozen at −70° C. in a layer approximately 0.5 cm thick. This layer was lyophilized at a pressure of 60–100 mtorr, a platen temperature of 0–60° C. and a condenser temperature of −80° C. The resulting lyophilized flakes could be resuspended by blending 2.00 g of the dry microspheres with 8.0 ml of cold water. This mixture was then homogenized using a high shear mixer holding the container over an ice bath to prevent overheating. The reconstituted suspension was comprised of microspheres and some agglomerates of microspheres. The median particle size of the microspheres and agglomerates was 0.73 microns (80% of the particles and agglomerates had a particle size between 0.29 and 3.82 microns) as measured by a Microtrac Small Particle Analyzer. Suspensions containing 20–40% by weight protein have a smooth, creamy mouthfeel akin to natural fat.

EXAMPLE 12

Preparation of Microspheres from Chemically Modified Prolamines

A solution of 10 g zein in 90% ethanol was acidified to pH 1.0 by the dropwise addition of 1N hydrochloric acid. The solution was held at 37° C. for approximately 100 hours, to achieve about 40% deamidation, i.e., 40% of the glutamine and asparagine residues were converted to glutamic acid and aspartic acid residues, respectively. The mixture was then neutralized to about pH 7.0 by addition of ammonium carbonate.

Method 1

The deamidated zein was utilized in the formation of microspheres. A 7 ml, 90% ethanol water solution containing 250 mg zein and 250 mg deamidated zein was pumped into an agitated, baffled beaker containing a 50 ml aqueous solution of 27 mg gum arabic and 27 mg medium viscosity CMC, forming a suspension of microspheres. The resultant suspension was at pH 6.7. and contained microspheres with a median particle size of 0.57 microns (80% of the microspheres had a particle size between 0.23 to 0.97 microns).

Method 2

A 7 ml. 90% ethanol-water solution containing 500 mg of deamidated zein was adjusted to pH 4.5 with 1N hydrochloric acid. This solution was slowly pumped into an agitated, baffled beaker containing a 50 ml aqueous solution of 27 mg gum arabic and 27 mg medium viscosity CMC, adjusted to pH 4.5. The resultant suspension contained microspheres with a median particle size of 0.85 microns (80% of the microspheres had a particle size between 0.38 to 2.30 microns).

EXAMPLE 13

Effect of Prolamine Concentration and Water Content On Particle Size

Method 1. Effect of Zein Concentration

A zein solution containing 64 g zein in 700 of 90% (v/v) ethanol-water was combined with a 2800 ml aqueous gum solution containing 3.56 g gum arabic and 3.56 g medium viscosity CMC in a flow-through mixing apparatus as described in Example 11, forming microparticles. The resultant suspension of microparticles had an increased particle size distribution with a median particle size of 1.10 microns (80% of the particles had a particle size between 0.35 and 3.38 microns). The control suspension described in Example 11 had a median particle size of 0.42 microns (80% of the particles had a particle size between 0.18 and 1.32 microns).

Method 2. Effect of Water Content

A zein solution containing 49 g zein in 700 ml of 75% (v/v) ethanol-water was combined with a 2100 ml aqueous gum solution containing 2.72 g gum arabic and 2.72 g medium viscosity CMC in a flow-through mixing apparatus as described in Example 11, forming microparticles. The resultant suspension of microparticles had an increased particle size distribution with a median particle size of 0.99 microns (80% of the particles had a particle size between 0.37 and 3.45 microns). The control suspension described in Example 11 had a median particle size of 0.42 microns (80% of the particles had a particle size between 0.18 and 1.32 microns).

EXAMPLE 14

Preparation of Microparticles Without the Use of Anti-Aggregating Agents

A solution of 49 g of zein in 700 ml 90% (v/v) ethanol-water was blended with 2800 ml water acidified with 0.47 ml 12N HCl (pH 2.51) in the flowthrough mixing cell described in Example 11. The resultant suspension was at pH 3.13, had a conductivity of 357 micromho and was comprised of particles of median particle size 0.43 microns (80% of the particles had a particle size between 0.13 and 4.49 microns).

EXAMPLE 15

Concentration of Microparticles by Evaporation

Evaporation may be used to concentrate the zein particles, in place of the ultrafiltration/ diafiltration described in Example 11 as long as the suspension is not exposed to aggregating thermal conditions.

Zein (type F-4000) was purified by contacting a 20 g sample in 200 ml of 90% (v/v) ethanol-water with 4.0 g of powdered, activated carbon for 30 minutes. The carbon was then removed by filtration. This purified zein solution was then used to form microspheres by precipitation into an agitated, 1000 ml aqueous solution of 1.11 g gum arabic and 1.11 g medium viscosity sodium CMC at 50° C. The resultant suspension contained particles of which 90% had a particle size of less than 2.10 microns.

This suspension was concentrated by rotary evaporation by taking 1000 ml of the suspension, and evaporating in a vacuum of about 30 torr and a bath temperature of 47° C. Once the volume had been reduced to 140 ml (a 7.1 fold concentration) minimal effect on the particle size was observed with 90% of the particles having a particle size of less than 2.64 microns. Continuing to evaporate to 112 ml (a 9.2 fold concentration) resulted in a small, but detectable, agglomeration of the particles with 90% of the particles having a particle size of less than 7.75 microns.

EXAMPLE 16

Thermal Stability and Oil Compatibility of Prolamine Microparticles

Thermal stability of the concentrated microsphere suspension can be enhanced with the addition of oils. Zein was purified with carbon by contacting a solution of 7 g zein in 100 ml 90% (v/v) ethanol-water with 1.4 g of activated carbon powder for 30 minutes. Then, the carbon was removed by filtration and 0.056 g soybean oil (Crisco Brand, The Procter & Gamble Company, Cincinnati, OH), and 0.16 g diacetyl tartaric acid esters of distilled monoglycerides (Myvatem 30, Kodak, Inc., Rochester, NY) were added. The solution was heated to 50° C. and combined with a 400 ml aqueous solution containing 0.39 g gum arabic and 0.39 g medium viscosity CMC at 70° C. in a 600 ml beaker vigorously agitated with a magnetic stirrer. The resultant suspension had a median particle size of 0.69 microns (80% of the particles had a particle size between 0.28 and 1.91 microns). This suspension was concentrated on a rotary evaporator to 200 ml, at about 30 torr, while being subjected to a water bath temperature of 50° C. The final concentration to 55 ml was done using an Amicon PM 30 membrane in a stirred cell 62 mm in diameter.

The thermal stability, measured by the onset of aggregation, as measured by the Microtrac Small Particle Analyzer, was determined at 9.4% solids. A 1 ml sample of the concentrated microsphere suspension was placed in a 2 ml reaction vial, which, in turn, was placed in a 70° C. oil bath. After 30 minutes, the particle size was measured. There was no substantial change in the particle size distribution (90% of the particles below 2.19 microns prior to heating, and 2.23 microns after heating).

A control suspension was prepared in a similar manner, but omitting the addition of the soybean oil and Myvatem 30. In the control suspension, 90% of the particles had a diameter less than 1.96 microns prior to heating. After heating the 9.2% solids, control suspension in the manner described above for thermal stability testing, agglomerates formed such that 90% of the agglomerates were less than 6.41 microns.

EXAMPLE 17

Preparation of Frosting Using Zein Fat Substitute

Method 1

Dried zein microspheres, prepared according to the procedure described in Example 11, and having a median particle size, prior to lyophilization, of 0.77 microns (80% of the particles had a particle size between 0.23 and 2.91 microns) were substituted for the fat in frosting. The frosting had the following composition:

| | Frosting Formulation | |
|---|---|---|
| | Weight Percentage | |
| Ingredients | Control | Fat Reduced |
| Sugar, 10X | 70.42 | 73.71 |
| Butter | 22.01 | 8.19 |
| Salt | 0.09 | 0.08 |
| Vanilla Extract | 0.88 | 0.41 |
| Almond Extract | 0.00 | 0.20 |
| Whole Milk | 6.60 | 14.34 |
| Zein Powder (dry) | 0.00 | 3.07 |
| Caloric reduction (calculated) | | 16.0% |
| Fat reduction | | 60.0% |
| Fat Equivalence* | | 0.28 |

*Fat equivalence is defined as the ratio of the weight of dry microspheres in the fat-reduced formula to the weight of fat removed from the control formula.

In a mixing bowl, the dried microparticles and butter were blended and creamed for 3 minutes. When smooth, 24.0 parts (24.0% (w/w) of the total formulation) of the sugar was added, and creaming continued for an additional 2 minutes. Salt, vanilla and almond extracts were blended into the mixture until smooth. The whole milk, and the remaining sugar were added alternately with agitation, and mixing continued for 5 minutes.

The fat reduced frosting was creamy, exhibited a uniform character and good spreadability. It had good color, good flavor and mouthfeel, with substantiallyno off-flavors, off-odors or aftertaste.

Method 2

An aqueous suspension of zein microspheres having a solids content of 25.9% was prepared according to the procedure described in Example 11, omitting the lyophilization and reconstitution steps. The micropheres had a median particle size of 1.43 microns (80% had a particle size between 0.48 and 4.06 microns). The frosting had the following composition:

| | Frosting Formulation | |
|---|---|---|
| | Weight Percentage | |
| Ingredients | Control | Fat Reduced |
| Sugar, 10X | 54.96 | 62.50 |
| Corn Syrup (42 DE) | 0.00 | 10.00 |
| Non-Fat Milk Solids | 2.20 | 6.00 |
| Water | 7.69 | 0.00 |
| Superglycerinated Frosting Shortening | 35.16 | 3.00 |
| Instant Starch | 0.00 | 2.50 |
| Trisodium Polyphosphate | 0.00 | 0.50 |
| Salt | 0.00 | 0.10 |
| Vanilla Extract | 0.00 | 0.40 |
| Zein Microsphere Suspension (25.9% solids) | 0.00 | 15.00 |
| Caloric reduction (calculated) | | 33% |
| Fat Reduction | | 91.5% |
| Fat Equivalence | | 0.12 |

The dry ingredients (instant starch, non-fat milk solids, trisodium polyphosphate, salt and sugar) were blended until uniformly dispersed. Next, in a mixing bowl, the liquid ingredients (corn syrup, vanilla extract and zein microsphere suspension) were blended with the dry ingredients. This blend was then whipped at high speed for 3 to 5 minutes, until the mixture was completely uniform and creamy. The shortening was added, and the mixture was whipped for an additional 5 to 7 minutes, until it was fluffy and formed peaks. The fat reduced frosting had acceptable spreadability, color, flavor and mouthfeel, with substantially no off-flavors, off-odors or aftertaste.

EXAMPLE 18

Preparation of French-type Dressing Using a Zein Fat Substitute

A reduced-calorie, reduced-fat salad dressing was prepared from dry zein microparticles, prepared according to the procedure as described in Example 11. The suspension was comprised of microparticles with a median particle size of 1.32 microns (80% of the particles were between 0.45 and 3.48 microns). The salad dressing was prepared according to the following formula:

| | French-type Dressing Formulation | |
|---|---|---|
| | Weight Percentage | |
| Ingredients | Control | Fat Reduced |
| Cider Vinegar (50 grain) | 20.0 | 20.0 |
| Sugar | 12.0 | 12.0 |
| Salt | 4.0 | 4.0 |
| Tomato Paste | 7.0 | 7.0 |
| Paprika | 3.0 | 3.0 |
| Worcestershire Sauce | 0.8 | 0.8 |
| Potassium Sorbate | 0.1 | 0.1 |
| Mustard Powder | 0.5 | 0.5 |
| Water | 22.2 | 42.6 |
| Soybean Oil | 30.0 | 0.0 |
| Xanthan Gum | 0.4 | 0.0 |
| Zein Microspheres (dry) | 0.0 | 10.00 |
| Caloric Reduction (calculated) | | 69% |
| Fat Reduction | | 100% |
| Fat Equivalence | | 0.33 |

In a mixer, using a whip-type agitator, the microspheres and the water were mixed until a uniform dispersion was obtained. Then, the potassium sorbate, sugar, salt, ground paprika and mustard powder were added, and the mixture was blended at a slow speed for several minutes to allow the soluble solids to dissolve, and to uniformly suspend the insoluble solids. Under continued agitation, the vinegar, tomato paste and worcestershire sauce were added, and the mixture was blended for an additional 15 minutes. The fatreduced dressing was judged to have acceptable viscosity and flow characteristics, acceptable flavor and mouthfeel, and substantially no off-odors or aftertaste.

EXAMPLE 19

Preparation of Frozen Desserts Using a Zein Fat Substitute

Frozen desserts were prepared using a 25.9% solids suspension of zein microspheres prepared according to the procedure described in Example 11, omitting the lyophilization and reconstitution steps. The microparticles had a median particle size of 1.43 microns (80% of the particles had a particle size of between 0.48 and 4.06 microns).

Method 1

The following formulation was used in the preparation of the frozen dessert:

| Frozen Dessert Formulation | | |
|---|---|---|
| | Weight Percentage | |
| Ingredients | Control | Fat Reduced |
| Skim Milk | 64.24 | 67.59 |
| Sugar | 10.96 | 10.96 |
| Cream (40% fat) | 9.97 | 0.00 |
| Corn Syrup Solids (36 DE) | 6.98 | 6.98 |
| Non-Fat Milk Solids | 6.54 | 6.78 |
| Microcrystalline Cellulose | 0.60 | 0.60 |
| Stablizer/Emulsifier Blend Mono- and Diglycerides, Guar, CMC, Polysorbate 80, Carageenan | 0.40 | 0.40 |
| Natural Vanilla, 4X | 0.31 | 0.31 |
| Zein Microsphere Suspension (25.9% solids) | 0.00 | 6.38 |
| Caloric Reduction (calculated) | | 19.2% |
| Fat Reduction | | 100% |
| Equivalence | | 0.42 |

The liquid ingredients were combined in a pasteurization vat and heated to 43° C. under constant agitation. Once this temperature was reached, the dry ingredients were added, under continuous agitation. When all of the dry ingredients were dissolved, the temperature was increased to 63° C., and the mixture was homogenized in a two-stage homogenizer with the first-stage at about 2000 psi, and the second-stage at about 500 psi. Then, the mixture was pasteurized by maintaining 63° C. for 30 minutes. The mix was then cooled to 4° C. and aged for 4 to 18 hours. After aging, flavors were added, and the mix was processed in a small batch freezer. Once the mix became semi-solid (−8 to −6° C.), it was transferred into its final package, and stored in a hardening room maintained at −40° C. The flavor, texture and overall acceptability of the fat reduced product were comparable to the control formulation.

Method 2

The following formula was used to prepare a fat-reduced frozen dessert:

| Frozen Dessert Formulation | | |
|---|---|---|
| | Weight Percentage | |
| Ingredients | Control | Fat Reduced |
| Water | 39.35 | 50.35 |
| Cream (37% butterfat) | 33.00 | 0.00 |
| Sugar | 12.00 | 12.00 |
| Non-Fat Milk Solids | 11.00 | 11.00 |
| Corn Syrup Solids (35 DE) | 4.00 | 4.00 |
| HG Special Stablizer | 0.30 | 0.30 |
| Vanilla, 4X | 0.35 | 0.35 |
| Zein Microsphere Suspension (25.9% solids) | 0.00 | 22.00 |
| Caloric Reduction (calculated) | | 40% |
| Fat Reduction | | 100% |
| Fat Equivalence | | 0.47 |

The dry ingredients were blended and added to a combination of the water and cream. This mixture was blended with a high shear mixer (The Virtis Company, Gardiner, NY). Next, the suspension of zein microparticles was blended in to form a uniform mixture. Then, the mixture was heated to 82° C., homogenized (as described in Method 1), and cooled to 4° C. Finally, the vanilla was added, and the mix was frozen as described in Method 1. The fat reduced formulation was comparable to the control for spoonability, creaminess, iciness and melting characteristics.

EXAMPLE 20

Preparation of Margarine Spread Using a Zein Fat Substitute

A reduced-calorie, reduced-fat margarine spread was prepared using a 25.9% solids suspension of zein microspheres as described in Example 19. The formula for the fat reduced product is as follows:

| Margarine Spread Formulation | | |
|---|---|---|
| | Weight Percentage | |
| Ingredients | Control | Fat Reduced |
| Partially Hydrogenated Soybean Oil | 80.0 | 0.0 |
| Durtex 100 ™ (emulsified shortening) | 0.0 | 40.0 |
| Durlo ™ (emulsifier) | 0.0 | 1.0 |
| Lecithin | 0.5 | 0.5 |
| Mono- and Diglycerides | 0.5 | 0.0 |
| Water | 15.0 | 13.65 |
| Salt | 1.0 | 0.75 |
| Butter Flavor | 0.0 | 4.0 |
| Flavors | 3.0 | 0.1 |
| Zein Microsphere Suspension (25.9% solids) | 0.00 | 40.00 |
| Caloric Reduction (calculated) | | 40% |
| Fat Reduction | | 50% |
| Fat Equivalence | | 0.25 |

The fat (e.g., shortening or oil) and emulsifiers were combined and melted. Then, all of the ingredients were combined and homogenized in a high shear mixer (The Virtis Co.). Finally, the mixture was cooled to 4° C., and held until set (overnight). The fat reduced spread was judged to be creamy, and organoleptically similar to the control, and exhibited acceptable emulsion stability.

EXAMPLE 21

Preparation of Poultry Frankfurters Using a Zein Fat Substitute

Reduced-calorie, reduced-fat poultry frankfurters were prepared using dry zein microspheres, prepared according to the procedure described in Example 11. The median particle size of the microspheres was 1.32 microns (80% of the particles had a particle size between 0.45 and 3.48 microns). The formulation of the frankfurters is as follows:

| Poultry Frankfurter Formulation | | |
|---|---|---|
| | Weight Percentage | |
| Ingredients | Control | Fat Reduced |
| Mechanically Deboned Poultry Meat (12% fat) | 67.15 | 67.15 |
| Ice | 10.00 | 10.00 |
| Water | 9.18 | 9.18 |
| Cure (nitrite) | 0.24 | 0.24 |
| Seasoning | 3.84 | 3.84 |
| Lard | 7.67 | 0.00 |
| Oil | 1.92 | 0.00 |
| Fat Substitute Blend: | | |
| Zein microspheres (dry) | 0.00 | 2.30 |
| Oil | 0.00 | 1.92 |
| Water | 0.00 | 5.37 |
| Caloric Reduction (calculated) | | 30% |
| Fat Reduction | | 43% |
| Fat Equivalence | | 0.30 |

The meat, salt, cure and half each of the seasoning, water and ice were chopped in a silent cutter for 3 minutes, at which time the remaining ingredients were added and chopping was continued until the mixture reached 12° C. (about 8 to 10 minutes). This mixture was stuffed into casings, using a stuffer, and hand linked (twisted) every 15 cm. The links were placed in a four stage smoke house, where the first-stage was at 58° C. for 10 minutes; the second-stage was at 70° C. with smoke for 25 minutes; the third-stage was at 80° C. with smoke for 30 minutes (these conditions allowed the internal temperature of the frankfurters to reach about 68° C.) The fourth-stage of the smokehouse contained a cold water shower for quick chilling. Then, the frankfurters were stored overnight at 4° C., after which the casings were removed.

The frankfurters made by this method could be reheated by standard methods, i.e., pan frying, boiling, microwave heating and oven baking. The core firmness (Food Technology Shear Press) and mouthfeel were comparable to the control.

EXAMPLE 22

Preparation of Sour Cream-Like Product Using a Zein Fat Substitute

A reduced-calorie, reduced-fat sour cream-like product was prepared using a 25.9% solids suspension of zein microspheres as described in Example 19. The formula is as follows:

| Sour Cream Formulation | | |
|---|---|---|
| | Weight Percentage | |
| Ingredients | Control | Fat Reduced |
| Skim Milk | 50.80 | 56.20 |
| Cream (40% fat) | 45.00 | 11.25 |
| Non-Fat Milk Solids | 3.20 | 4.55 |
| Lactic Culture | 1.00 | 1.00 |
| Rennet, Single-Strength | 0.0014 | 0.0014 |
| Zein Microsphere Suspension (25.9% solids) | 0.00 | 27.00 |
| Caloric Reduction (calculated) | | 48.4% |
| Fat Reduction | | 75% |
| Fat Equivalence | | 0.50 |

The cream, microsphere suspension, and skim milk were combined and heated to 43° C. in a steam jacked, agitated kettle. Then, the non-fat milk solids were dissolved in this mixture, and the temperature was raised to 63° C. Next, the mixture was homogenized in a two-stage homogenizer, in which the first-stage was at about 2500 psi, and the second-stage was at about 500 psi. The mixture was then heated to about 82° C., and held at this temperature for 25 minutes. The mixture was allowed to cool to about 27° C., and the rennet was added. This mixture was transferred to individual serving cups, and fermented for 16 to 20 hours at 80° C., after which, the cups were refrigerated at 4° C. An acceptable sour cream-like product was obtained.

EXAMPLE 23

Preparation of Low-Fat Milk-Based Beverage Using Zein Fat Substitute

A low-fat milk-based beverage was prepared using a 25.9% solids suspension of zein microspheres as described in Example 19. The formulation is as follows:

| Milk Formulation | | | |
|---|---|---|---|
| | Weight Percentage | | |
| Ingredient | Control I | Control II | Fat Reduced |
| Skim Milk | 7.1 | 91.9 | 96.6 |
| Whole Milk (3.5% fat) | 92.9 | 0.0 | 0.0 |
| Cream (40% fat) | 0.0 | 8.1 | 0.0 |
| Water | 0.0 | 0.0 | 1.7 |
| Zein Microsphere suspension | 0.0 | 0.0 | 1.7 |
| Caloric reduction (calculated) | | | 44% |
| Fat reduction | | | 100% |
| Fat Equivalence | | | 0.13 |

The controls were prepared by combining either whole milk and skim milk, or skim milk and cream, and then adjusting to 3.25% fat. The reduced-fat formulation was prepared by combining all of the ingredients. Each of the milk formulations was heated to 60° C., and homogenized in a two-stage homogenizer, where the first-stage was operated at about 1500–2000 psi and the second-stage was operated at about 400-500 psi. Then, each formulation was pasteurized by maintaining a temperature of 63° C. for 30 minutes. Finally, each formulation was cooled to about 4° C. and stored. The flavor, color, texture and overall acceptability of the reduced-fat formulation was judged to be comparable to the control formulations.

EXAMPLE 24

Preparation of a Peanut Spread Using Zein Fat Substitute

A reduced-calorie, reduced-fat peanut spread was prepared using a 25.9% solids suspension of zein microspheres as described in Example 19. The microparticles had a median particle size of 1.43 microns (80% of the particles had a particle size between 0.48 and 4.06 microns). The formula for the product is as follows:

| Peanut Spread Formulation | | |
|---|---|---|
| | Weight Precentage | |
| Ingredient | Control | Fat Reduced |
| Peanut butter | 100 | 50 |
| Corn syrup (42 DE) | 0 | 25 |
| Zein Microsphere suspension (25.9% solids) | 0 | 25 |
| Caloric reduction (calculated) | | 32% |
| Fat reduction | | 50% |
| Fat Equivalence | | 0.25 |

The peanut butter and corn syrup were blended together in a mixing bowl. Then, the microsphere suspension was added, and blended until a uniform mixture was attained. An acceptable peanut spread was obtained. The color, texture and flavor of the fat-reduced peanut spread resembled the control.

EXAMPLE 25

Preparation of a Spoonable Dressing Using Zein Fat Substitute

A mayonnaise-type spoonable dressing was prepared using a 25.9% solids suspension of zein microspheres as described in Example 19. The microparticles had a median particle size of 1.43 microns (80% of the particles had a particle size between 0.48 and 4.06 microns). The formula for the product is as follows:

| Mayonnaise-type Spoonable Dressing Formulation | |
|---|---|
| Ingredient | Weight Percentage |
| Salt | 3.0 |
| Sugar | 5.0 |
| Mustard powder | 0.5 |
| Vinegar, 50 grain | 12.0 |
| Water | 33.0 |
| Egg yolk | 6.0 |
| Xanthan gum | 0.5 |
| Soybean oil | 20.0 |
| Zein Microsphere suspension (25.9% solids) | 20.0 |
| Comparison to a standard mayonnaise (USDA Agricultural Handbook No. 8): | |
| Caloric Reduction (calculated) | 66.3% |
| Fat Reduction | 72.7% |
| Fat Equivalence | 0.09 |

The salt, sugar, mustard powder, vinegar and water were combined with an electric mixer at low speed for 1 minute. Next, the egg yolk and the zein microsphere suspension were added, and the mixing speed was increased to medium for 1-2 minutes. The oil was added first by reducing the mixing speed to low and slowly adding a suspension of the xanthan in 5 parts (5% of the total formulation) oil, then by mixing at a medium speed for 2 minutes, and finally by slowly adding the remaining oil while mixing at a high speed. After all of the oil was added, mixing was continued at a high speed for an additional 5 minutes, the sides of the bowl were scraped, and the mixture was re-mixed for another 3-5 minutes. The dressing was light yellow, smooth and had an acceptable mayonnaise appearance and texture.

EXAMPLE 26

Microencapsulation of Ferratin

A solution containing 6 g of zein (regular grade F-4000) in 94 g of 90% (v/v) ethanol-water, was added at a rate of 0.5 ml/min to a rapidly agitated solution of 100 mg Ferratin from horse spleen (Sigma Chemical Co.) in 100 ml of water containing 0.9 g NaCl, and 0.12 g Trizma base (Sigma Chemical Co.), which had been adjusted to pH 7.4 with 1N hydrochloric acid. The precipitation was conducted at 20° C. The resulting suspension was dialyzed, using a 100.000 NMWL hollow fiber cartridge (Amicon Corp.), against 1 liter of water containing 1.2 g of Trizma base, which had been adjusted to pH 7.4 using hydrochloric acid. The dialyzed suspension was then lyophylized according to the procedure described in Example 6.

The final product contained 6 g of zein encapsulating 10 mg of Ferratin. This product was administered to a culture of vaginal carcinoma cells (ATCC Line ME180, CASKI). After 24 to 72 hours, the cells were examined by transmission electron micro scopy (TEM). The release of Ferratin from the encapsulating zein was evidenced by the presence of patches of electron-dense regions as seen by TEM.

EXAMPLE 27

Microencapsulation of Rhodamine B

A solution of 0.5 g regular grade zein (F-4000) and 100 mg Rhodamine B (Sigma Chemical Co.) in 49 ml of 90% (v/v) ethanol-water was added at a rate of 0.5 ml/min to a rapidly agitated beaker of 400 ml water to form a suspension of microspheres. The precipitation was conducted at 20° C. The resulting suspension was dialyzed with a 100,000 NMWL hollow fiber cartridge (Amicon Corp.) against 1 liter of deionized water to remove the unencapsulated Rhodamine. The final suspension was lyophilized to a dry powder according to the procedure set out in Example 5, and sterilized by autoclaving at 120° C. for 30 minutes.

The encapsulated drug was administered to a culture of vaginal carcinoma cells (ATCC Line ME180, CASKI) by adding the encapsulated Rhodamine to the media. The incorporated particles were imaged using light microscopy, and the release of Rhodamine monitored by epifluorescence of the Rhodamine. After 24 hours, numerous particles were seen within the cells and the cytoplasma of the cells fluoresced when exposed to light at a wavelength of 586 nm.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. Microparticles consisting essentially of hydrophobic protein, said hydrophobic protein being water-insoluble in its non-denatured state, said microparticles having a generally spherical shape and a median particle size of less than about 200 microns and said microparticles being water-dispersible whereby they are freely dispersible in an aqueous medium to form a homogeneous non-aggregated suspension of said microparticles.

2. Microparticles of claim 1 wherein the hydrophobic protein comprises a prolamine.

3. Microparticles of claim 2 wherein the prolamine is derived from a grain selected from the group consisting of corn, wheat, barley, rice and sorghum.

4. Microparticles of claim 3 wherein the prolamine comprises zein.

5. Microparticles of claim 1 having a median particle size of less than about 4 microns.

6. Microparticles of claim 4 having a median particle size of less than about 4 microns.

7. Microparticles of claim 6 wherein the hydrophobic protein has been chemically modified.

8. Microparticles of claim 7 wherein the hydrophobic protein has been chemically modified by treatment with an acid or base.

9. Microparticles of claim 6 wherein the hydrophobic protein has been enzymatically modified.

10. A stable aqueous dispersion comprising microparticles of claim 1 suspended in an aqueous medium.

11. A stable aqueous dispersion of claim 10 wherein the aqueous medium comprises water or an aqueous alcohol solution containing less than 40%, by weight, alcohol.

12. A stable aqueous dispersion of claim 10 wherein the aqueous medium comprises an aqueous solution of ethanol or 2-propanol.

13. A dry powder comprising microparticles of claim 11.

14. A stable aqueous dispersion comprising rehydrated powder of claim 13 in an aqueous medium.

15. A stable aqueous dispersion of claim 14 containing up to about 40%, by weight, microparticles.

16. A stable aqueous dispersion of claim 10 additionally including a dispersion stabilizing agent comprising a gum or surface active agent.

17. Microparticles consisting essentially of prolamine, which prolamine is water insoluble in its non-denatured state, said microparticles having a generally spherical shape and a median particle size of less than about 4 microns and said microparticles being water-dispersible whereby they are freely dispersible in an aqueous medium to form a homogeneous non-aggregated suspension of said microparticles.

18. Microparticles of claim 17 wherein said prolamine comprises zein.

19. A fat-substitute comprising a stable aqueous dispersion of microparticles of hydrophobic protein, said hydrophobic protein water-insoluble in its non-denatured state said microparticles being a generally spherical shape, and having a substantially uniform particle size with a median particle size of less than about 4 microns, said fat-substitute having organoleptic properties of a fat.

20. A fat-substitute of claim 19 wherein said hydrophobic protein comprises a prolamine.

21. A fat-substitute of claim 20 wherein said prolamine is derived from a grain selected from the group consisting of corn, wheat, barley, rice and sorghum.

22. A fat-substitute of claim 20 wherein said hydrophobic protein comprises zein.

23. A fat-substitute of claim 22 containing up to about 40%, by weight, zein.

24. A fat-substitute comprising microparticles of a prolamine dispersed in an aqueous medium, which prolamine is water insoluble in its non-denatured state, said microparticles having a generally spherical shape and a median particle size of less than about 4 microns and said fat-substitute having organoleptic properties of a fat.

25. A fat-substitute of claim 24 wherein said prolamine comprises zein.

26. A fat-substitute comprising spherical microparticles of zein dispersed in an aqueous medium containing a stabilizing agent, said zein microparticles having a median diameter of less than about 4 microns and said fat-substitute having organoleptic properties of a fat.

27. A food product containing a fat-substitute of claim 19.

28. A food product containing a fat-substitute of claim 23.

29. A food product having all or a portion of its fat replaced with a fat-substitute of claim 26.

30. A food product normally containing fat in which all or a portion of fat has been replaced by a fat-substitute comprising a stable aqueous dispersion of microparticles of hydrophobic protein, said hydrophobic protein being water-insoluble in its non-denatured state, said microparticles having a generally spherical shape and a substantially uniform particle size with a median particle size of less than about 4 microns, said fat-substitute having organoleptic properties of a fat in said food product.

31. A food product of claim 30 wherein said hydrophobic protein comprises a prolamine.

32. A food product of claim 31 wherein said prolamine is derived from a grain selected from the group consisting of corn, wheat, barley, rice and sorghum.

33. A food product of claim 30 wherein said hydrophobic protein comprises zein.

34. A food product of claim 33 wherein the fat-substitute has a fat equivalence of from about 0.1 to about 0.5.

35. A food product of claim 30 comprising a frosting.

36. A food product of claim 30 comprising a salad dressing.

37. A food product of claim 30 comprising a frozen dessert.

38. A food product of claim 30 comprising a margarine type spread.

39. A food product of claim 30 comprising a sour cream product.

40. A food product of claim 30 comprising a low-fat milk-based beverage.

41. A food product normally containing fat in which all or a portion of fat has been replaced by a fat-substitute comprising a stable aqueous dispersion of generally spherically shaped microparticles of zein having a substantially uniform particle size with a median particle size of less than about 4 microns and a stabilizing agent comprising a gum or surface active agent, said fat-substitute having organoleptic properties of a fat in said food product.

* * * * *

UNITED STATES PATENT AND TRADEMARK OFFICE
CERTIFICATE OF CORRECTION

PATENT NO. : 5,021,248

DATED : June 4, 1991

INVENTOR(S) : Leonard E. Stark and Akiva Gross

It is certified that error appears in the above-identified patent and that said Letters Patent is hereby corrected as shown below:

Claim 13, column 26, line 59, change "11" to ---1---;

Claim 19, column 27, line 11, after "protein", insert ---being---;

Signed and Sealed this

Second Day of March, 1993

Attest:

STEPHEN G. KUNIN

Attesting Officer

Acting Commissioner of Patents and Trademarks